United States Patent [19]
Saitoh et al.

[11] Patent Number: 5,855,728
[45] Date of Patent: Jan. 5, 1999

[54] METHOD FOR CLEANING VULCANIZATION MOLD

[75] Inventors: Shinji Saitoh; Shingo Ohno; Nobuko Kato, all of Kodaira; Kazuo Naito, Kawasaki; Yasuhiro Horiike, Houya, all of Japan

[73] Assignee: Bridgestone Corporation, Tokyo, Japan

[21] Appl. No.: 802,429

[22] Filed: Feb. 18, 1997

[30] Foreign Application Priority Data

Feb. 15, 1996 [JP] Japan ............................ 8-027767
Feb. 15, 1996 [JP] Japan ............................ 8-027768

[51] Int. Cl.$^6$ ........................................ B44C 1/22
[52] U.S. Cl. ............................ 156/345; 216/69
[58] Field of Search ............ 216/69, 70; 156/345 MW, 156/345 ME

[56] References Cited

U.S. PATENT DOCUMENTS

| | | |
|---|---|---|
| 4,534,921 | 8/1985 | Fierkens et al. |
| 4,576,692 | 3/1986 | Fukuta et al. ............ 216/69 X |
| 5,312,519 | 5/1994 | Sakai et al. |

FOREIGN PATENT DOCUMENTS

| | | |
|---|---|---|
| 618 017 | 10/1994 | European Pat. Off. |
| 740 989 | 11/1996 | European Pat. Off. |
| 08207056 | 8/1996 | Japan |
| 08216164 | 8/1996 | Japan |
| 08244041 | 9/1996 | Japan |
| 2 108 533 | 5/1983 | United Kingdom |

*Primary Examiner*—William Powell
*Attorney, Agent, or Firm*—Sughrue, Mion, Zinn, Macpeak & Seas, PLLC

[57] ABSTRACT

A cleaning method for realizing uniform ashing of residues at a high efficiency by uniformly injecting neutral active species directly toward the surfaces of vulcanization residues left on a vulcanization mold is described. The method includes setting a ring-shaped cavity in face-to-face reaction with the inner surfaces of a ring-shaped vulcanization mold in a vacuum treating vessel, transmitting a microwave in the cavity, and emitting the microwave via a number of coupling slots formed in the outer side of the cavity toward the inner surfaces of the vulcanization mold whereupon a reaction gas is injected in the space of the treating vessel between the inner surfaces of the vulcanization mold and the cavity, so that a plasma including a major proportion of neutral active species generated from the reaction gas and the emitted microwave, and the elastomer residue is ashed by means of at least one gas selected from the plasma gas and a neutral active species-containing gas. A microwave generator useful for the method is also described.

8 Claims, 3 Drawing Sheets

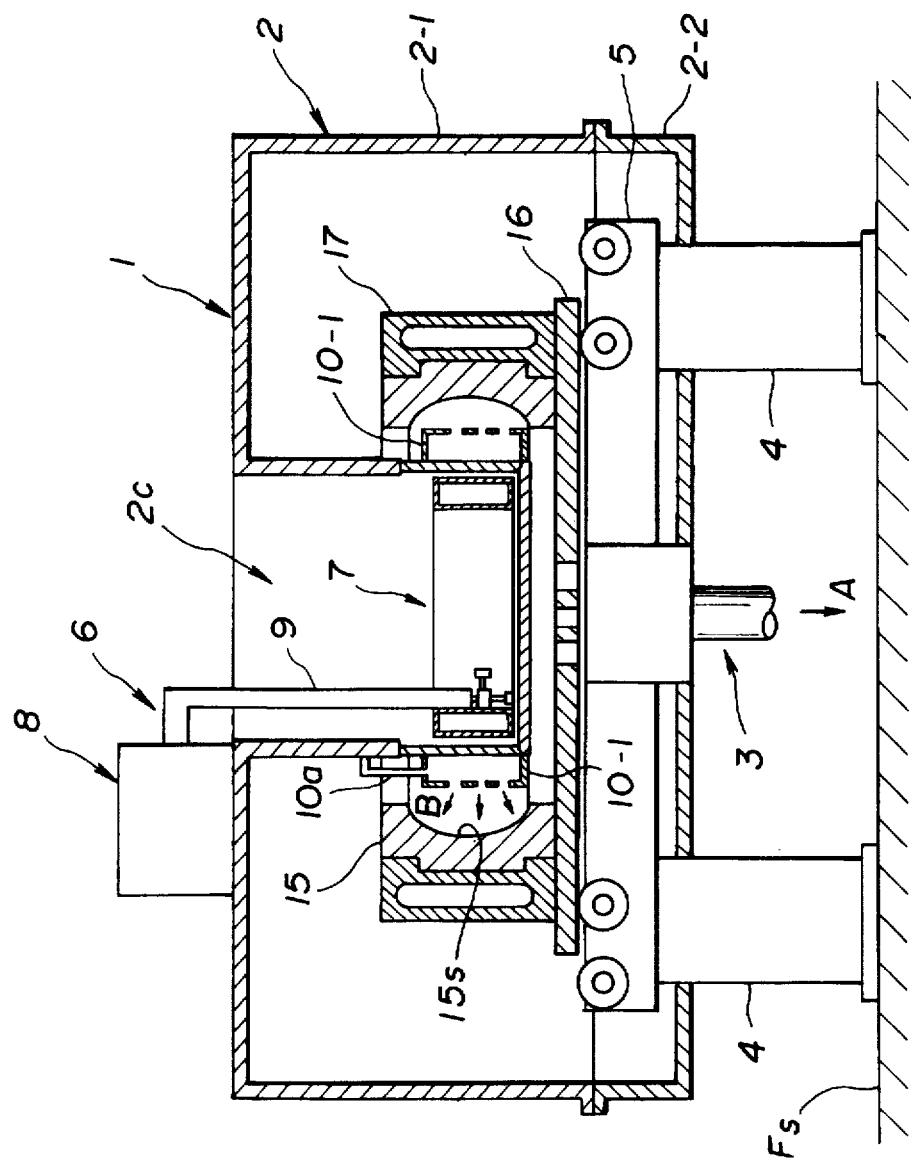

METHOD FOR CLEANING VULCANIZATION MOLD

BACKGROUND OF THE INVENTION

The present invention relates to a method for cleaning a vulcanization mold to conveniently remove elastomer residues inevitably formed on inner molding surfaces of a mold (surfaces including mating mold surfaces for a split type mold) and in recessed portions or holes of the mold when the mold is repeatedly used for vulcanization molding of rubber articles such as rubber tires and vibration-proof rubbers. More plastic elastomer articles; and more particularly this invention relates to a method for cleaning a vulcanization mold which is able to stably, uniformly treat the residue without involving any inconvenient degradation or damage of the vulcanization mold and without being affected by formation of a non-uniform zone or region of a plasma distribution. The invention also relates specifically as to a microwave plasma generator which is particularly adapted for cleaning a vulcanization mold and with which the vulcanization residue can be beneficially removed.

As described in detail in Japanese Patent Laid-open No. Hei 6-285868, assigned to the same assignee, in order to satisfy required performance of elastomer articles, particularly, rubber tire articles (hereinafter, referred to simply as tire or tires), and vibration-proof rubber articles, it is necessary that natural rubber, synthetic rubbers or blends thereof be formulated, aside from a sulfur crosslinking agent and a carbon black reinforcing material, with vulcanization accelerators and various types of chemicals for keeping durability.

For vulcanization molding of the thus formulated, unvulcanized rubber composition, chemical reactions including a crosslinking reaction are generally caused at a high temperature close to 200° C. In this condition, the rubber composition not only becomes more fluid, but also is partly gasified. Eventually, it is inevitable that the rubber composition and chemical reaction products fixedly deposit as a residue, although small in amount, not only on the molding surfaces of the mold, but also in very narrow spaces of the mating mold surfaces and in holes such as so-called vent holes whenever the vulcanization molding is carried out. The repetition of a great number of the vulcanization molding cycles permits the residue to be deposited in a thickness which is not negligible. This has been, more or less, experienced in the vulcanization molding of other types of elastomers as well as rubber compositions.

The thick vulcanized residue strongly attached to and deposited on the vulcanization mold impedes the appearance of tires, adversely influences the quality of the tire as a whole. Accordingly, it is necessary that a vulcanization mold after having been subjected to a predetermined number of vulcanization molding cycles is cleaned until it looks like a fresh one. The cleaning has been predominantly performed according to a shot blast method wherein granules such as plastic beads or glass beads are blown against the mold by means of a high pressure gas or according to a liquid cleaning method wherein the mold is immersed in solutions of acids, alkalis or amines. In order to overcome the disadvantages of these cleaning methods, the present applicant has proposed in the above-mentioned Japanese Patent Laid-open No. Hei 6-285868 a vulcanization mold cleaning method using a plasma, with which remarkable results have been obtained.

However, when the results are checked in more detail, it has been found that there is some room for improvement with respect to the following points.

The first point resides in that a multitude of projections such as ribs and sipes (fine elongated pieces) are formed on mold-forming faces of a vulcanization mold to be cleaned in order to form thick grooves, fine grooves and slits in a tread portion which are usually essential to ensure the required characteristics of tires other than specific types of tires. A plasma is interrupted with these projections, so that it is liable to impede uniform ashing of the vulcanized residue over an entire region to be cleaned.

The present applicant has proposed apparatus and method of the uniform ashing of residues in Japanese Patent Laid-open Nos. Hei 8-207056, 8-216164 and 8-244041: one of electrodes to which high frequency electric power is applied is arranged in the form of a cylinder or is arranged as having a multitude of fins on the periphery thereof; and a plasma is caused by discharge between the one electrode and the inner surface of a vulcanization mold serving as the other electrode.

The following points are disadvantageous ones caused by positioning the vulcanization mold within a discharge zone. More particularly, the second point resides in that a non-uniform discharge region is often formed, with the tendency that a uniform ashing treatment is apt to be impeded.

The third point is that a phenomenon sometimes takes place wherein the temperature of the vulcanization mold reaches, for example, 200° C. owing to the non-uniform discharge. This impedes the accuracy of the mold, bringing about the degradation and damage of the mold.

The fourth point has the relation with the third point and resides in the difficult temperature control of the vulcanization mold.

The fifth point resides in that surfaces other than those to be cleaned are exposed to the discharge zone or region, so that the thus exposed surface may be degraded or damaged.

In order to overcome the problems involved in the first to fifth points, we have proposed in Japanese Patent Laid-open No. Hei 8-300366, a method for ashing an elastomer residue wherein a plasma generating furnace capable of supplying neutral active species (radicals), and a microwave generator for converting a reaction gas passed into the furnace to a gas containing neutral active species by means of a microwave discharge plasma are provided in a vacuum treating vessel. The neutral active species generated in the plasma generating furnace are introduced via a pipe into the treating vessel. The thus introduced neutral gas species are uniformly injected toward all faces of a residue on or in a vulcanization mold, thereby ashing the elastomer residue by means of the thus injected neutral active species-containing gas.

The cleaning of the vulcanization mold by the above method shows a remarkable effect on the solution of the problems. Through the cleaning operations of the above method, a further problem to solve has been found. More particularly, the above method is disadvantageous in that a gas which contains a great amount of the neutral active species generated in the plasma generating furnace is fed via a pipe to the treating vessel, during which part of the neutral active species is deactivated, resulting in the lowering of an ashing efficiency.

SUMMARY OF THE INVENTION

Accordingly, an object of the invention is to provide a method for cleaning a vulcanization mold which overcomes all of the problems mentioned above and which is able to realize uniform ashing of residues at a significantly high efficiency without placing any limitation on the shape and the size of molding-forming faces of a vulcanization mold and without any adverse influence on the vulcanization mold.

Another object of the invention is to provide a microwave plasma generator which can be conveniently used for cleaning a vulcanization mold.

To achieve the above objects, according to a first aspect of the present invention, there is provided a method of cleaning a vulcanization mold which includes placing a vulcanization mold in a vacuum treating vessel, and acting a plasma of a low pressure reaction gas on an elastomer residue formed on inner surfaces of the mold by repeating the vulcanization molding of elastomers to remove the residue by ashing, characterized by providing a ring-shaped cavity in face-to-face relation with the inner surfaces of the vulcanization mold placed in the treating vessel, transmitting a microwave from a microwave generator to the cavity, emitting the transmitted microwave through a number of coupling slots formed at the outside of the cavity toward the inner surfaces of the vulcanization mold while injecting a reaction gas into a space of the treating vessel established between the inner surfaces of the vulcanization mold and the cavity to generate a plasma from the injected reaction gas and the emitted microwave, and ashing the elastomer residue by means of at least one of the resultant plasma gas and a neutral active species-containing gas produced by the plasma.

According to a second aspect of the present invention, there is provided a microwave plasma generator of the type which includes a vacuum treating vessel accommodating a ring-shaped body having inner surfaces to be treated, and a plasma generating means for forming a microwave plasma region to which the surfaces to be treated of the body accommodated in the treating vessel are exposed, characterized in that the plasma generating means has a gas feed unit for feeding a reaction gas to the plasma region, and a microwave emitting device including a microwave generating source, and a ring-shaped cavity which is arranged in face-to-face relation with the surfaces to be treated of the body at the inner side of the plasma region and which has a plurality of coupling slots at the outer side thereof, the microwave emitting device being arranged such that a microwave from the microwave generating source is transmitted to the ring-shaped cavity.

In the method of the invention, a microwave is directly emitted from the cavity against the elastomer residue formed on the surfaces of the mold during the course of the repeated vulcanization molding cycles of elastomers while injecting a reaction gas in the space of the vacuum vessel established between the surfaces on which the elastomer residue has been deposited and the cavity to convert the reaction gas into a plasma. In this condition, the residue is directly blown with or exposed to at least one gas selected from the resultant plasma gas and a neutral active species-containing gas. Thus, it is possible to overcome disadvantages such as the damage of the vulcanization mold, the lowering in density of the plasma gas, and the deactivation of the neutral active species and to uniformly, effectively remove the residue by ashing at a high efficiency of electric power within a short treating time.

The microwave plasma generator of the invention is not limited to the ashing treatment of vulcanization residues in molds, but is applicable to the plasma treatment of other types of bodies, thereby ashing a good treating performance and achieving a significantly improved efficiency.

BRIEF DESCRIPTION OF THE DRAWINGS

FIG. 4 is an illustrative view similar to FIG. 1 but showing a modification of the generator of FIG. 1.

DETAILED DESCRIPTION OF THE PREFERRED EMBODIMENTS

Hereinafter, one embodiment of a microwave plasma generator according to the invention will be described in detail with reference to FIGS. 1 to 3.

Figure 1:
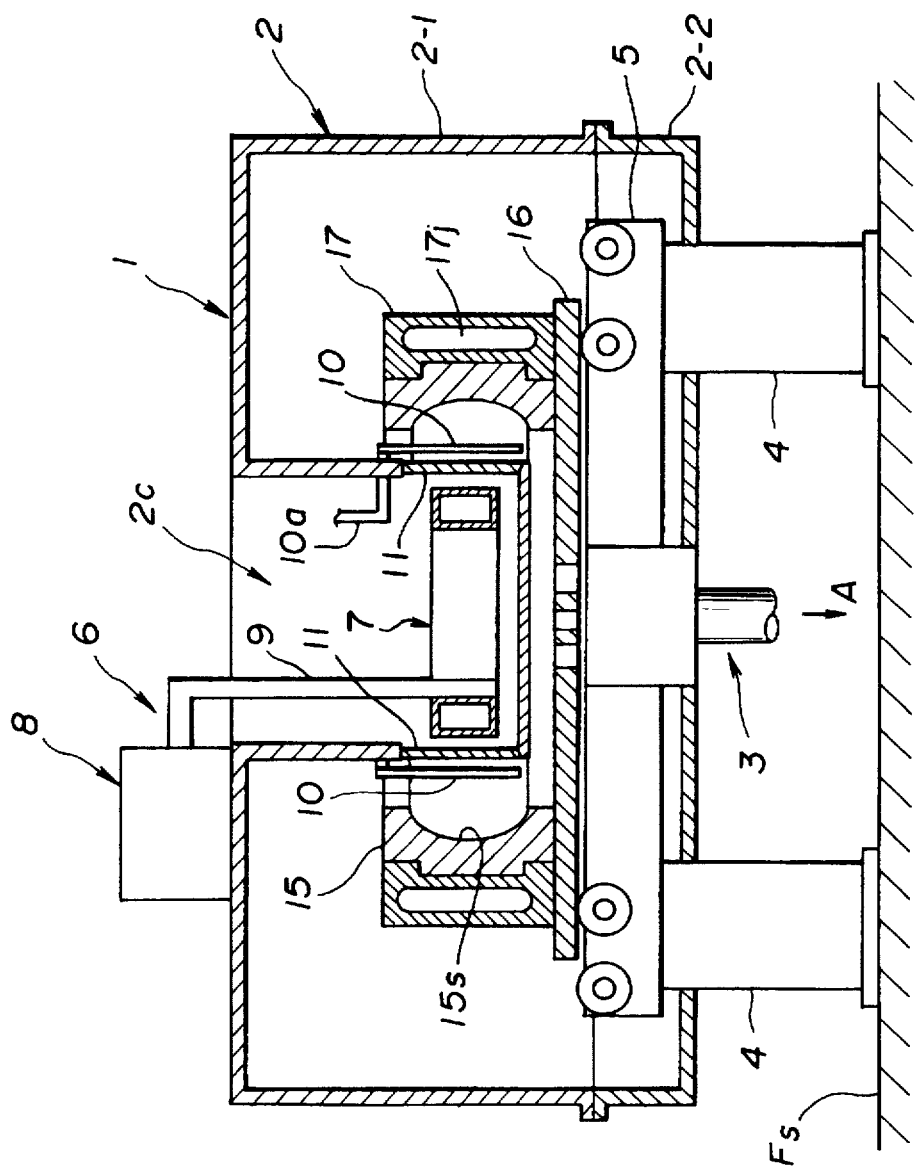
FIG. 1 is a schematic illustrative view showing a microwave plasma generator according to the invention, with essential parts illustrated in cross-section.

FIG. 1 shows a microwave plasma generator having a vacuum treating vessel and a plasma generating means, wherein essential parts of the former are illustrated in vertical cross-section and the latter is schematically illustrated, and wherein a ring-shaped workpiece accommodated in the treating vessel, i.e. a vulcanization mold in this embodiment is illustrated in cross-section. FIG. 2 is a perspective view of a ring-shaped cavity having coupling slots, which is shown in FIG. 1; and FIG. 3 is a schematic plan view of an essential part of the generator.

Referring to FIG. 1, a vacuum treating vessel 1 includes a container 2 having an upper container 2-1 and a lower container 2—2 which are vertically detachable from each other at a low position of the vessel 1 and are able to be sealedly coupled with each other. The upper container 2-1 has a cylinder-shaped recess 2C projecting toward the inside of a vulcanization mold (hereinafter, referred to simply as cleaning) provided at a central, treating (hereinafter referred to as cleaning) position thereof as opposing to the inner peripheral surface of the mold 15. The upper container 2-1 is vertically movable along an upper direction relative to the lower container 2—2. The recess 2C has a depth such that its bottom reaches a level corresponding to the lower face of the mold 15 which is in cleaning position.

The lower container 2—2 has a suction unit 3 connected to a vacuum pump not shown. Prior to commencement of the cleaning operation of the mold 15, the vacuum pump is driven, so that the air in the container 2 is exhausted via the suction unit 3 along arrow A in the figure until the air pressure in the container 2 arrives at a so-called moderate to high vacuum, for example, of $10^{-1}$ to $10^{-5}$ Torr. It will be noted that the lower container 2—2 of the vacuum treating vessel 1 shown in the figure is fixedly supported on a floor Fs along with a wheel conveyor 5, for example, by means of a plurality of supports 4 (only two supports shown in the figure). The wheel conveyor 5 holds the mold 15 to be cleaned which is mounted on a mold platen 16.

The microwave plasma generator includes a microwave emitting device 6 as a plasma generating means. The device 6 has a ring-shaped cavity 7 provided in the vicinity of the bottom of the recess 2c of the upper container 2-1 at a position such that the cavity 7 is in face-to-face relation with the inner surface 15s of the mold 15. A microwave generating source 8; and a hollow rectangular waveguide 9 through which the microwave generated by means of the microwave generating source 8 is electromagnetically coupled with the inside of the cavity 7. The cavity 7 is made of a metal and forms a resonant cavity with its shape being a hollow cylinder or a hollow polygon.

The microwave generating source 8 generates and outputs a microwave whose frequency is within a range of 300 MHz to 30 GHz, preferably, 1 GHz to 10 GHz. The microwave output is transmitted via the rectangular waveguide 9 to the cavity 7. In order to permit the microwave to be transmitted from the rectangular waveguide 9 to the ring-shaped cavity 7, a technique using, for example, a conductive coupler rod is effectively used. The height of the inside space or cavity portion of the cavity 7 should preferably be 6.12 cm or above when the microwave has a frequency, for example, of 2.45 GHz.

Figure 2:
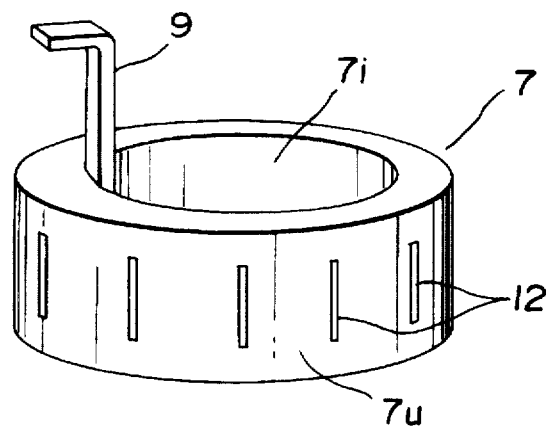
FIG. 2 is a perspective view showing a cavity and a rectangular waveguide used in the generator of FIG. 1.

Referring to FIGS. 1 and 2, the hollow cylinder-shaped cavity 7 of this embodiment has a number of vertically elongated coupling slots 12 arranged at intervals around an outer peripheral portion 7u thereof as shown. Each slot 12 communicates to the cavity portion. Although the thickness of a metal used to form the cavity 7 is not critical, the circumferential length along the inner surface of an inner peripheral portion 7i should preferably be such a value as to be calculated by multiplying ½ of a wavelength in the cavity determined by use of the frequency of the microwave and the height of the cavity portion in the cavity 7 by an integer. In this condition, a stationary microwave generates in the cavity portion of the cavity 7. It is effective to form individual coupling slots 12 at a position corresponding to a node of the stationary wave. For example, the coupling slots 12 are provided at a position distant by a quarter (¼) of the wavelength in the cavity from a microwave inlet such as a coupler rod and at a position distant by a half (½) of the wavelength in the cavity from the first-mentioned position.

The plasma generating means has a gas feed unit for feeding a reaction gas to a microwave plasma region against a treating surface of the mold 15. As shown in FIGS. 1 and 3, the feed unit consists of a plurality of reaction gas injection containers indicated by reference numeral 10. In this embodiment, a plurality of paired reaction gas injection pipes 10 are depicted as the feed unit. Reference numeral 11 indicates a window portion made of a non-conductive material such as, for example, alumina or quartz and constitutes at least a part of the sides of the recess 2c of the container 2, contributing to the generation of a plasma. The window portion 11 cylindrically extends from the bottom of the recess 2c to about the level of the inner surface of the mold 15, i.e. to about the height of the cleaning region.

As shown, the reaction gas injection pipes 10 are positioned between the window portion 11 and the inner surface 15s of the mold 15 in the treating vessel 1, i.e. between the ring-shaped cavity 7 and the inner surface 15s of the mold 15. In the embodiment shown in the figure, a pair of the pipes 10 are provided at opposite sides of each coupling slot 12. These pairs of the pipes 10 communicates with a ring-shaped pipe (not shown) and are fixed. The ring-shaped pipe is connected to a reaction gas introduction pipe 10a, and a fed reaction gas is received in the pipes 10. The respective pairs of the pipes 10 have small holes as opposing to each other. The reaction gas fed from the pipes 10 through the ring-shaped pipe are injected through the small holes in the direction shown by arrow B (see FIG. 3) or toward the inner surfaces 15s of the mold 15.

When the microwave plasma generator is operated, the microwave transmitted from the microwave generating device 8 via the rectangular waveguide 9 radially emits an adequate electromagnetic wave energy via the coupling slots 12 toward the inner surfaces 15s of the mold 15. At the same time, a reaction gas is injected from the pipes 10, whereupon the reaction gas is converted into a plasma state by the action of the electromagnetic wave energy, thereby generating a high density plasma gas and a neutral active species-containing gas having a satisfactory concentration of the species.

This neutral active species-containing gas arrives at the residue-bearing inner surface of the mold to be cleaned without passing through any additional path, so that its deactivation on the way of the arrival is very small. Since the plasma generating unit is close to the inner surface of the mold, not only the neutral active species-containing gas, but also the plasma arrives at the cleaning surface, thus contributes to the ashing action. In view of the fact that only the electromagnetic wave is emitted, abnormal discharge does not take place. Any disadvantages involved by the abnormal discharge can be excluded. Thus, it is possible to generate a uniform plasma gas at a high density along with the neutral active species-containing gas without consumption of additional electric power. The vulcanization residue can be ashed at a high efficiency.

If the reaction gas consists of any one of an oxygen gas or a mixed gas composed of a major proportion of oxygen gas and a halide gas, the efficiency of the ashing treatment can be further improved. The oxygen gas used as the reaction gas may be either $O_2$ or $O_3$. The halide gases may include all gases containing F (fluorine), Cl (chlorine), Br (bromine), and I (iodine). Since it is sufficient to feed a gas to the vacuum treating vessel 1, the reaction gas may not be in the form of a gas under standard conditions (25° C., 1 atom.) but in the form, for example, of a liquid under such conditions. Preferably, a freon, $NF_3$, and $SF_6$ are used. More specifically, $CF_4$ (carbon tetrafluorine) is used.

In order to provide a plasma gas and/or a neutral active species-containing gas which has a desired density, the frequency of the microwave and the electric energy in the microwave electric source 8, and the amount (SCCM) of a reaction gas should be properly selected. When using oxygen gas alone or a mixed gas composed of a major proportion of oxygen gas and a minor proportion of a halide gas, preferably, $CF_4$ gas as a reaction gas, oxygen ($O$, $O_2$ and $O_3$) radicals and $CF_4$ radicals are obtained. During the course of the ashing treatment, the vacuum pump is driven so that the gas in the vacuum treating vessel 1 is invariably, continuedly exhausted from the suction unit 3 along the direction of arrow A. The pressure in the treating vessel 1 should be invariably kept at a given pressure ranging from 0.01 to 10 Torr.

In FIG. 1, reference numeral 17 indicates a temperature control jacket which is employed as a heating source for heating the mold 15. A heating medium such as a hot gas or steam is fed into an inner space 17j of the jacket 17. Preferably, the mold 15 is heated to and kept at a desired temperature ranging from 100° to 180° C. When the mold 15 is maintained at such a high temperature as mentioned above, the ashing reaction velocity is further increased, thus contributing to the remarkable shortage of a plasma ashing time. Although not shown in the figures, the mold 15 is provided with a temperature measuring sensor to control the temperature and/or the flow rate of the heating medium in the jacket 17 and also to control the temperature of the mold 15 at the outside of the treating vessel 11. In this manner, the sensor and the jacket 17 constitute, in combination, a temperature control system of the mold 15.

The mold 15 is shown as an integral body. In this embodiment, a number of segments, e.g. 3 to 20 segments, which form an outer mold among so-called split molds, are shown as being temporarily assembled in practical use on the upper surface of the supporting and transferring mold platen 16 made of a metal such as steel.

The portion of the mold 15 where a tread face and various types of grooves and slits are formed in the tread portion of a tire is usually made of an aluminum alloy. In practical application, the alloy portion is attached to a steel holding member to make the above-mentioned segment. In the practice of the invention, both a body using the alloy portions alone and a body using the segments are called the mold 15.

Where the mold 15 is made of split molds, a pair of side molds are assembled on and below the segment molds shown in the figure to provide a mold body. The mold body can be used as the vulcanization mold 15 and cleaned with a plasma. The method of the invention is also applicable to upper and lower two matched metal molds having mating surfaces along the circumference and only one segment mold among a number of segment molds.

Although not particularly shown, the mold platen 16 is provided with a mechanism of setting a segment assembly or a segment mold in position when a number of segments are temporarily assembled or when split molds and upper and lower matched molds are set. The mold platen 16 is provided with a mechanism which allows the mold 15 as an assembled body or the mold 15 made of plural matched molds to be centered about the central axis of the recess 2c. The latter mechanism is in centering engagement with a centering device of the wheel conveyor 5 which supports the mold 15 and the mold platen 16.

The mold 15 is placed in the treating vessel 1 in such a way that the upper container 2-1 is moved upwardly and kept at that position, under which the mold 15 temporarily assembled and mounted on the mold platen 16 at the outside of the treating vessel is transferred along with the mold platen 16 by means of another wheel conveyor (not shown) to a position as shown in FIG. 1. In this condition, the centering is performed.

FIG. 4 is an illustrative view similar to FIG. 1 except that the reaction gas injecting pipes 10 of the apparatus of FIG. 1 are changed to a longitudinally elongated container 10-1 and the inner side of the container 10-1 is used as part of the window portion 11. In this case, a plasma is generated in the container 10-1. At least one of the generated plasma gas and neutral active species-containing gas is injected from injection ports toward the inner surface 15s of the mold 15 (in the direction of arrow B). The apparatus shown in FIG. 4 can be operated as having described in the first embodiment with similar results. The cavity 7 and the rectangular waveguide 9 shown in FIGS. 1 and 4 may be accommodated in the treating vessel 1.

EXAMPLE

The invention will be more clearly understood with reference to the following example.

Figure 3:
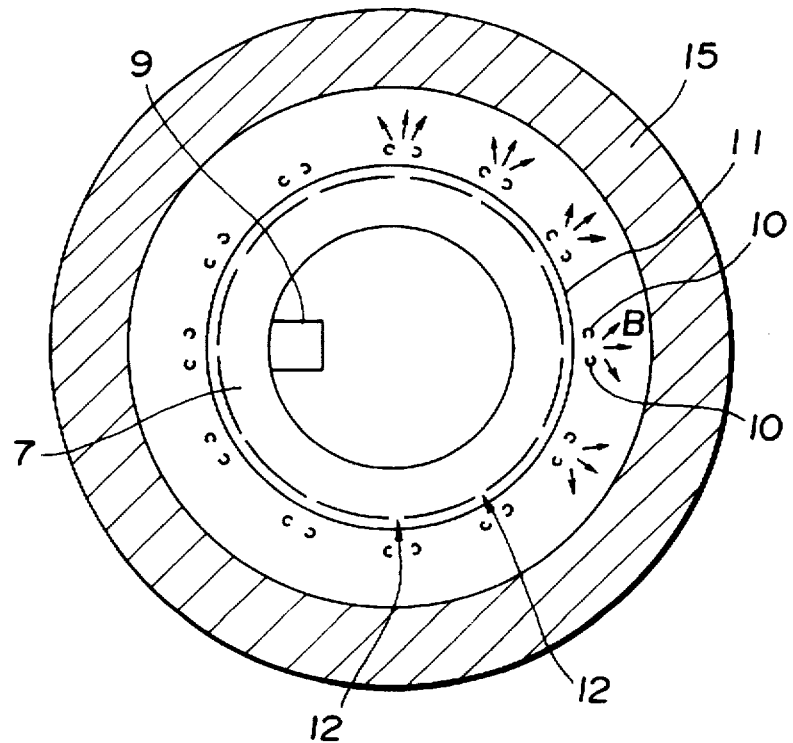
FIG. 3 is an enlarged plan view showing an essential part of FIG. 1.

In accordance with the apparatus shown in FIGS. 1 to 3, a mold 15 (maximum inner diameter: 550 mm) including 8 segments was accommodated in a temperature control jacket 17 as mounted on a mold platen 16, followed by setting in position of a vacuum treating vessel 1. Containers 2-1, 2—2 were mutually sealed and fixed together, after which a vacuum pump was driven so that the pressure in the treating vessel 1 was reduced to a level of $2 \times 10^{-3}$ Torr.

A mixed gas consisting of $O_2$ gas and $CF_4$ gas was provided as a reaction gas. The former gas was passed at a rate of 1000 SCCM and the latter was passed at a rate of 500 SCCM. The pressure of the resultant plasma in the treating vessel 1 was kept at 1.0 Torr. A microwave having a frequency of 2.45 GHz was outputted from a microwave generating source 8. The microwave was transmitted through a rectangular waveguide 9 from which an electromagnetic wave energy was emitted to generate a plasma. The plasma predominantly composed of oxygen radicals was acted on the inner surfaces of the mold 15. Coupling slots 12 made in the cavity 7 had a height of 6.12 cm and the output power of the microwave was 6 kW.

In this example, the temperature of the mold 15 was not controlled at all by use of the jacket 17 for comparison with Comparative Example appearing hereinafter. The temperature of the mold 15 was naturally increased by means of the energy of the plasma. Two different ashing times were used including 60 minutes and 120 minutes. The degree of ashing after completion of the ashing treatment was evaluated by visual observation according to a five-point evaluation method wherein a greater value is better on a maximum of 5 points. The degree of cleaning was assessed, according to a five-point evaluation method, by visual observation of an ashed surface after washing the surface with water to remove ashes therefrom (e.g. inorganic metal salts such as $ZnSO_4$, which were substantially free of any adhesion to metals).

In order to confirm the ashing effects in the example, an ashing treatment for comparison was performed according to the method set forth in the afore-mentioned Japanese Patent Laid-open No. Hei 8-300366, assigned to the same assignee. The treating conditions of Comparative Example were in coincidence with those of the example, and the evaluation and judgement were made in the same manner as in Example. The ashing treatments in Example and Comparative Example were, respectively, repeated ten times, and the measurements and their evaluations were carried out in every treatment. The results are summarized in Table 1 below.

TABLE 1

| Treating Method | Treatment No. | Treating Time (minutes) | Degree of Ashing | Degree of Cleaning |
|---|---|---|---|---|
| Comparative Example | 1 | 60 | 2 | 2 |
| | 2 | 60 | 3 | 2 |
| | 3 | 60 | 2 | 2 |
| | 4 | 60 | 2 | 2 |
| | 5 | 60 | 3 | 2 |
| | 6 | 120 | 4 | 4 |
| | 7 | 120 | 4 | 4 |
| | 8 | 120 | 4 | 3 |
| | 9 | 120 | 4 | 4 |
| | 10 | 120 | 5 | 4 |
| Example | 1 | 60 | 4 | 4 |
| | 2 | 60 | 4 | 4 |
| | 3 | 60 | 5 | 4 |
| | 4 | 60 | 4 | 3 |
| | 5 | 60 | 4 | 4 |
| | 6 | 120 | 5 | 4 |
| | 7 | 120 | 5 | 5 |
| | 8 | 120 | 5 | 5 |
| | 9 | 120 | 5 | 5 |
| | 10 | 120 | 5 | 4 |

As will be apparent from Table 1, the treatments of Example are far superior in the degree of ashing and cleaning to those of Comparative Example when the treating time is at the same level. This gives evidence that the method for removing vulcanized residues from a mold according to the invention is more improved in the cleaning efficiency than the method proposed in our earlier application.

We claim:

1. A microwave plasma generator of the type which comprises a vacuum treating vessel accommodating a ring-shaped body having inner surfaces to be treated, and a plasma generating means for forming a microwave plasma region to which the surfaces to be treated of the body accommodated in the treating vessel are exposed, characterized in that said plasma generating means has a gas feed unit for feeding a reaction gas to the plasma region, and a microwave emitting device including a microwave generating source, and a ring-shaped cavity which is arranged in face-to-face relation with the surfaces to be treated of the body at the inner side of the plasma region and which has a plurality of coupling slots at the outer side thereof, said microwave emitting device being arranged such that a microwave from the microwave generating source is transmitted to the ring-shaped cavity.

2. The generator according to claim 1, further comprising a temperature control means for heating and keeping said body in said vacuum treating vessel at a temperature ranging from 100° to 180° C.

3. The generator according to claim 1, wherein said gas feed unit comprises a plurality of reaction gas injection pipes positioned between the surfaces of the body to be treated and said ring-shaped cavity.

4. The generator according to claim 3, further comprising an annular window positioned radially outside said ring-shaped cavity and radially inside said gas injection pipes.

5. The generator of claim 3, wherein a gas injection pipe is positioned at a side of each coupling slot, to form a pair of pipes for each slot.

6. The generator of claim 2, wherein said temperature control means comprises a temperature control jacket positioned outside said ring-shaped body.

7. The generator of claim 1, wherein said ring-shaped body comprises a vulcanization mold.

8. The generator of claim 7, wherein said vulcanization mold comprises a split mold having a plurality of segments.

* * * * *